United States Patent Office 2,917,368
Patented Dec. 15, 1959

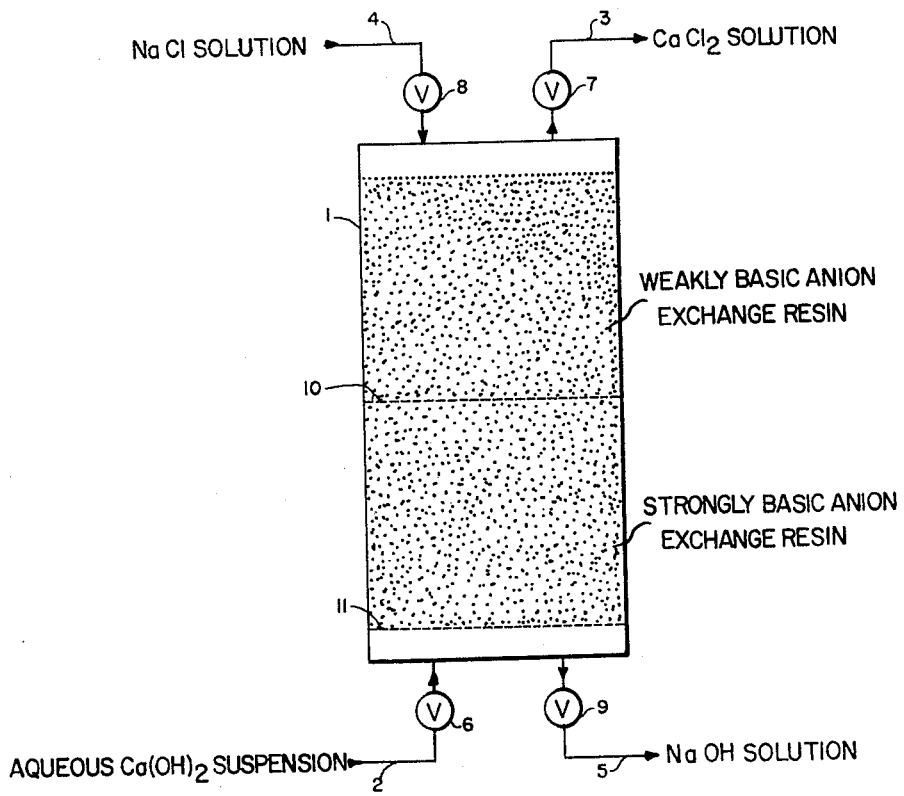

2,917,368

METHOD OF PRODUCING CAUSTIC BY ION EXCHANGE AND REGENERATION THEREOF

Walter Juda, Lexington, Mass., assignor to Ionics, Incorporated, Cambridge, Mass., a corporation of Massachusetts Application January 16, 1957, Serial No. 634,421

9 Claims. (Cl. 23—185)

This invention relates to the production of alkali metal hydroxides from salts by use of anion exchange resins in the hydroxyl form and the regeneration of said resins with lime. More particularly, this invention is directed to the use of at least two resins of different basic strength with production of caustic by passage of a brine first through the weaker resin then through the stronger resin followed by regeneration with an aqueous lime bearing material first through the stronger resin and then through the weaker resin, the process being carried out if desired by cyclic countercurrent operation to the desired degree of exhaustion and regeneration.

The prior art has recognized and disclosed at a comparatively early date the concept of preparing caustic soda (NaOH), or the like, by an anion exchange reaction wherein a sodium chloride solution is contacted with an anion exchange material in the hydroxyl form, causing the anion ($Cl^-$) of the salt solution to be partially exchanged or substituted by the anion ($OH^-$) of the resin and an effluent containing NaOH is recovered. Such procedures are disclosed in U.S. Patents No. 1,238,916 to Charles P. Hoover and No. 2,606,098, issued August 5, 1953 to W. C. Baumann. After at least partial exhaustion of the hydroxyl of the anion exchange material, the latter is contacted with a lime solution. This regenerates the resin at least partially to the hydroxyl form for continuance of the cycle of producing caustic. With many qualifications of the anion exchange resins, temperature controls, direction of flow, and concentration of solutions employed, this general procedure is believed to be the state of the art as of the present time.

In addition, the use of successive cation exchangers of differing acid strength have been proposed for recovering components from sulfite cooking liquors.

The prior art processes represented by the procedures above have not been commercialized for economic reasons including high water consumption, excessive lime consumption, and high resin investment since the hydroxyl concentration in saturated aqueous lime solution is 0.04 milliequivalents per milliliter. The high water consumption is required to dissolve and carry the quantity of lime necessary for regeneration into the bed. The low hydroxyl concentration in aqueous lime solution is unable to drive the regeneration reaction to substantial completion, resulting in low utilization of the lime since so little of it can be used for exchange. The high resin investment is required because the regeneration rate is dependent on regenerant concentration, (which is low owing to the slight solubility of lime) and the proximity to ion exchange equilibrium. The present invention contemplates employing various aqueous lime-bearing regenerants including (a) lime in the form of an aqueous suspension, (b) lime intimately and uniformly dispersed in the anion exchange resins and in contact with water, saturated aqueous lime, or an aqueous lime suspension for regeneration of the resin to the hydroxyl form. These modifications for regenerating the anion exchange resins increase the efficiency of the process of the present invention, namely, employing successive beds in series of anion exchange resins of different basic strength with countercurrent flow of regenerant and brine.

The object of the present invention is to provide an improved method of producing alkali metal hydroxides which enables such processes to be operated with enhanced economy so as to be commercially competitive with, and in many cases less expensive than other known methods of producing caustic. Another object is to provide optimum regeneration efficiency in such processes. Another object is to minimize the resin investment for a given caustic production rate.

One form of the process of the present invention utilizes two anion exchange resins of differing basic strength located in two distinct portions of a single ion exchange column or in two or more successive ion exchange columns in series, said resins being substantially in the salt form. An aqueous lime solution or suspension is passed firstly through the stronger resin and the effluent from this resin is passed through the weaker resin to convert the resins substantially to the hydroxide form. Thereafter in a countercurrent manner, an aqueous sodium chloride containing solution preferably of high concentration is passed first through the weaker resin and then through the stronger resin thereby becoming partially converted by ion exchange to sodium hydroxide. The process is cyclic and can be carried out in simple and conventional process equipment to the desired degree of conversion. The effluent caustic-salt mixture may be subsequently evaporated in known ways to contain a caustic of desired concentration and to remove unconverted salt therefrom.

The two or more resins mentioned above differ from each other in basic strength which is inversely related to hydroxide affinity. Such affinity may be quantitatively defined as: the equilibrium ratio of hydroxide to chloride absorbed on the resin divided by the ratio of hydroxide to chloride ion concentrations in the solution with which the resin is equilibrated. This quantity will be referred to hereinafter as hydroxide affinity. A weak (i.e. weakly basic) resin has a high hydroxide affinity and a strong (i.e. strongly basic) resin has a low hydroxide affinity. (Hydroxide affinities may also be defined for salts other than chlorides. In general, resins with high hydroxide affinity in chloride solutions will also have a high hydroxide affinity in other solutions.) Such differences in basic strength are in general obtained by choice of the active groups on the anion exchange matrix. For example, most anion exchange resins of commercial interest achieve their ion exchange capacity through amine groups attached to the resin. Resins in which quaternized trimethyl amine is present as an active group (for example the commercially available "Dowex-1") have been found to have very low hydroxide affinities, for example 0.1, and are consequently very strongly basic. Resins in which the active group is quaternized dimethyl ethanol amine (for example the commerially available "Dowex-2") have been found to have a hydroxide affinity of the order of 1, and are consequently strongly basic although not as basic as the trimethyl resin. A resin having quaternized methyl diethanol amine shows an even higher hydroxide affinity (of the order of 10) and is consequently moderately strong, although not as strong as either of the two resins mentioned above. Resins in which the active groups are not quaternary are found to have very high hydroxide affinities (of the order of 100 or higher) and are consequently very weakly basic (a commercially available example is "Dowex-3" wherein a condensation product of diethylene triamine constitutes the active group).

In summary, a weak anion exchange resin (primary, secondary or tertiary amine e.g. "Dowex-3") would have an affinity of above 100, a moderately strong anion exchanger resin would have an affinity of the order of 10; a strong anion exchange resin (e.g. "Dowex-2"), would have an affinity of about 1; and a very strong anion exchange resin (e.g. "Dowex-1"), would have an affinity of about 0.1.

From the above considerations, it is clear that when compared with weak resins of high hydroxide affinity, strong resins with lower hydroxide affinity will more readily give up hydroxyl in exchange for chloride and therefor will produce higher concentrations of caustic. However, in regenerating such strong resins with a lime solution or slurry they will not as readily give up their chloride ions to become reconverted to the hydroxyl form, and higher quantities of lime regenerant solution and large excesses of lime will be required for a given degree of regeneration. This difference in properties can be effectively utilized by successive treatment of at least two anion exchange resins of differing basic strength. The mechanism of the operation of the present invention is made clear from the following explanation.

During regeneration with lime, a very strong resin such as "Dowex-1" is first contacted with the fresh lime solution, or suspension. Since this is fresh regenerant, the more difficultly regenerated strong resin can be efficiently regenerated; and a successive weaker resin such as "Dowex-2" contacted with the partially spent regenerant mixture of chloride and hydroxide from the regeneration of the very strong exchanger can still efficiently exchange chloride for hydroxide.

For production of caustic in the next portion of the cyclic process a strong brine is first contacted with the weak resin which can easily give up hydroxyl because of the low initial hydroxyl level in the brine. The resulting liquor is then contacted with the very strong resin which can give up hydroxyl ions even in the brine of relatively low chloride concentration leaving the previous weak resin. Such countercurrent operation with resins of different hydroxyl affinities (or basic strength) minimizes salt requirements, lime requirements, evaporation requirements, and resin investment.

If sea water is employed instead of a pure sodium chloride solution as the eluting salt solution in the above procedure it becomes necessary to remove the magnesium from the sea water. This may be effected by pretreating the sea water with a dilute base such as lime or ammonia precipitating magnesium hydroxide which is filtered from the sea water prior to passing the sea water to the ion-exchange resins for caustic production.

Many commercial grades of anion exchange resins are available and the recent development of strong and weak basic resins of the quaternary ammonium and polyamine cross-linked polymers of styrene types make possible the production of strong bases from the brines contacted with such successive resins. This requires efficient and economical regeneration and exhaustion of the ion exchange beds in the manner disclosed herein. It is also contemplated in the present invention to connect several columns in series for concurrent or countercurrent directions of flow during regeneration and exhaustion of the ion exchange beds for continuous cyclic operation as well as more efficient and economical operation for the production of caustic.

The accompanying drawing is a diagrammatic sketch illustrating an arrangement of apparatus which may be used in practicing the invention. The sketch is self-explanatory in structure and the sequence of the steps of the method is in accordance with the present disclosure in that with valves 8 and 9 closed, the aqueous lime suspension is first passed through open valve 6, in inlet conduit 2, to container 1, the latter having the two separate bodies of ion exchange resins therein as illustrated. A screen of porous separator 10 maintains the bodies apart with a similar screen 11 supporting the entire mass of resins within said container 1. The lime suspension passes first through the bed of strongly basic anion exchange resin which is at least partially in the chloride form, and thence through the bed of weakly basic anion exchange resin which is also at least partially in the chloride form. After converting or regenerating the anion exchange resins to their hydroxide forms by ion exchange, the converted calcium chloride solution is removed as an effluent through the open valve 7 in exit conduit 3. Valves 6 and 7 are then closed and valves 8 and 9 opened. A strong brine solution such as sea water or concentrated sodium chloride solution is then passed in countercurrent direction to the flow of the lime suspension through container 1, by way of open valve 8 of the inlet conduit 4. In passing through container 1, the strong brine solution first contacts the weakly basic anion exchange resin, now in the hydroxyl form, and thence through the strongly basic anion exchange resin, now also in the hydroxyl form. The product of the ion exchange reactions, caustic soda, passes through open valve 9 as the effluent from conduit 5. It is apaprent that the above described operation may be batch or continuous (cyclic) as desired.

The following examples illustrate practice of the invention, but are not to be construed as limiting the scope thereof.

*Example 1*

A ½ liter volume of a strong anion exchange resin with hydroxyl affinity of the order of 1 purchased from the Dow Chemical Co., Midland, Michigan, under the name of "Dowex-2" was placed in a glass column. This resin is a dimethyl ethanolamine derivative of chloromethylated copolymers of styrene and divinyl benzene. A ½ liter volume of a very strong anion exchange resin with hydroxyl selectivity of the order of 0.1 purchased from the Dow Chemical Co., Midland, Michigan, under the name of "Dowex-1" was placed in a second glass column. This resin is a trimethyl aminated chloromethylated copolymer of styrene and divinyl benzene. Both columns were initially 100% in the chloride form and each had anion exchange capacities of about 1 equivalent per liter of saturated bed volume, or specifically ½ equivalent in each of the two columns. A suspension of 150 grams of lime in 150 milliliters of water was injected upwardly into each bed and the mixtures agitated by blowing air upwardly through the beds. Water saturated with lime was then slowly passed upwardly through the column conatining the "Dowex-1" resin and then in series through the column containing the "Dowex-2" resin and collected for analysis. The temperature was about 20° C. After 2 hours (4 liters regenerant solution) the chloride contained in the combined effluents was 0.6 equivalents at a concentration of 0.036 N. Thus the beds were computed to have 60% of their capacity in the hydroxyl form after this regeneration.

Air was used to blow the residual solution from the beds downwardly and a slow flow (2 liter per hour) of 2.6 N NaCl solution was passed in a countercurrent manner first through the "Dowex-2" and then through the "Dowex-1" resins. After 0.6 liters of this solution was collected, it was found to contain 0.5 equivalents of NaOH and 0.8 equivalents of NaCl. Further elution with 3 additional liters of 2.6 N NaCl solution recovered an additional 0.1 equivalent of NaOH. Thus, substantially all the hydroxyl absorbed in regeneration was recovered as caustic soda.

*Example 2*

To compare the results obtained above with yields obtained when the present invention was not utilized a single bed containing 1 liter of "Dowex-2" was treated as follows.

A ½ liter volume of "Dowex-2" was placed in each of the glass columns used in Example 1 (i.e. one liter of resin in all). The resin was initially 100% in the chloride form and had an anion exchange capacity of about one equivalent per liter of settled bed volume. A suspension of 150 g. $Ca(OH)_2$ in 150 ml. water was injected upwardly into each bed, and the mixtures agitated by blowing air upwardly through the beds. A clear saturated lime solution at about 20° C. was then slowly passed upwardly through the bed, at a rate of 2 liters per hour and collected for analysis. After two hours (4 liters of regenerant solution) the chloride contained in the combined effluent was 0.4 equivalents, and its concentration in the effluent was 0.10 N. The hydroxyl concentration in this effluent was 0.036 N. The beds were computed to have 40% of their capacity in the hydroxyl form after this regeneration. Air was used to blow the residual solution from the beds downwardly and a slow (2 liter/hour) flow of 2.6 N NaCl was passed in a countercurrent manner downwardly through the beds. After 0.6 liter of this solution was collected, it was found to contain 0.3 equivalents of NaOH and 1.1 equivalents of NaCl. Further elution with 3 additional liters of 2.6 N NaCl recovered an additional 0.1 equivalent of NaOH. Thus much less caustic soda was produced from the same amount of resin and in far greater dilution.

*Example 3*

A ½ liter volume of "Dowex-2" anion exchange resin described above was placed in the bottom of a glass column. A ½ liter volume of a resin synthesized from methyl diethanol aminated chloromethylated copolymers of styrene and divinyl benzene was placed in the upper half of the column. This resin was made according to the conventional techniques for preparing anion exchange resins, for example, as described in U.S. Patents Nos. 2,591,573, 2,591,574 and 2,629,710. This synthetic resin containing quaternized methyl diethanol amine groups differed from the commercial dimethyl ethanol resins in that the hydroxide affinity was approximately 10, as opposed to approximately 1 for "Dowex-2." A fine screen was inserted between the two resin portions to prevent mixing and to maintain the resins in distinct regions of the column. The combined resins were initially 100% in the chloride form and each had an anion exchange capacity of about 1 equivalent per liter of settled bed volume. A clear saturated lime solution at 20° C. was then slowly passed upward through the bed at a rate of 2 liters per hour and collected for analysis. After 4 hours (8 liters of regenerant solution) the chloride contained in the combined effluent was 0.24 equivalent and its concentration in the effluent was 0.03 N. The hydroxyl concentration in this effluent was 0.006 N. The column was computed to have 24% of its capacity in the hydroxyl form after regeneration. Air was used to blow the residual solution downwardly from the column. A flow of 2 liters per hour of 2.6 N NaCl was passed downwardly through the column. After 0.6 liters were collected it was analysed to contain 0.16 equivalents of NaOH and 1.0 equivalent of NaCl. Further elution with 6 additional liters of NaCl recovered an additional 0.08 equivalent of NaOH.

From the above example it will be apparent that while good production of caustic soda was obtained the results were not as favorable as those obtained in Example 1, which is ascribed to the use of solid lime dispersed in the resin bed of Example 1 whereas a clear saturated lime solution was employed in Example 3, although the double strong and weak anion exchange beds were employed in each case.

*Example 4*

A series of two ½ liter columns of "Dowex-1" (columns 1 and 2), and two ½ liter columns of the quaternized methyl diethanol resin described in Example 3 above (columns 3 and 4) were mixed with lime as described in Example 1. Saturated lime solution was passed at a flow rate of 2 liters per hour upwardly through the columns in succession, the effluent from column 1 being fed to column 2, etc. The residual solution was blown out with air as described in the above examples. This regeneration was followed by elution with 2 liters of 3 N NaCl passed successively downwardly through columns 4, 3, 2, and 1, the residue removed with air in each case. After several cycles the following steady-state condition was obtained:

Regeneration:
 Time: 4 hours
 Volume: 8 liters
 Effluent chloride: 3.8 eq.
 Effluent hydroxide: 0.8 eq.
Production:
 Time: 1 hour
 Volume: 2 liters
 Effluent chloride: 2.2 eq.
 Effluent hydroxide: 2.0 eq.

The above example clearly indicates that caustic soda-salt mixtures capable of evaporation to produce commercially useful caustic soda with separation of crystallized salt can be efficiently produced on a continuous basis.

Various embodiments of the invention may be devised to meet various requirements.

Having described the invention, I claim:

1. A method of making an alkali metal hydroxide from lime and an alkali metal salt by exchange of ions which comprises, contacting a lime bearing aqueous solution successively with at least two separate bodies of anion exchange resins, the resin in the first of said bodies being appreciably more strongly basic than the resin in the second of said bodies the successive contacting of the lime-bearing solution being first with the more strongly basic resin and then with said second anion exchange resin, and thereafter successively contacting an aqueous solution of an alkali metal salt first with the less strongly basic anion exchange resin and then with the more strongly basic anion exchange resin.

2. A method of making an alkali metal hydroxide from lime and an alkali metal salt by exchange of ions which comprises, contacting a lime bearing aqueous solution successively with at least two separate bodies of anion exchange resins, the resin in the first of said bodies being appreciably more strongly basic than the resin in the second of said bodies the successive contacting of the lime-bearing solution being first with the more strongly basic resin and then with said second anion exchange resin, and thereafter successively contacting an aqueous solution of an alkali metal salt first with the less strongly basic anion exchange resin and then with the more strongly basic anion exchange resin in a direction countercurrent to the flow of lime bearing liquid through said ion exchange resins.

3. The method of claim 2 wherein the lime bearing aqueous solution consists of an aqueous, substantially saturated lime solution.

4. The method of claim 2 wherein the lime bearing aqueous solution consists of an aqueous lime suspension.

5. A method of making an alkali metal hydroxide from lime and an alkali metal salt by ion exchange which comprises, contacting a lime bearing aqueous solution successively with two bodies of anion exchange resins as two separate layers in a single container, the resin in the first of said bodies being appreciably more strongly basic than the resin in the second of said bodies the successive contacting of the lime-bearing solution being first with the more strongly basic resin and then with said second anion exchange resin, and thereafter successively contacting an aqueous solution of an alkali metal salt first with the less strongly basic anion exchange resin and then with the more strongly basic anion exchange resin in a direction countercurrent to the flow of lime bearing liquid through said ion exchange resins.

6. A method of making caustic soda from lime and alkali metal salt by exchange of ions which comprises, dispersing solid lime uniformly and intimately with at least one first basic anion exchange resin substantially in the salt form, uniformly and intimately dispersing solid lime with at least one second more weakly basic anion resin substantially in the salt form, passing water into contact with said first basic anion exchange resin mixture, passing the effluent therefrom through the second appreciably more weakly basic anion exchange resin mixture, thereafter passing an aqueous solution of alkali metal salt through said second basic anion exchange resin mixture, passing the effluent from the latter through said first basic anion exchange resin mixture, withdrawing the effluent from the latter as a caustic product, the flow of salt solution being in countercurrent direction to the flow of water through said ion exchange resins.

7. The method of claim 6 wherein said first anion exchange resin comprises a quaternary amine resin of trimethyl aminated, chloromethylated, cross-linked polymers of styrene and said second anion exchange resin comprises a quaternary amine resin of the dimethyl ethanolamine derivative of chloromethylated, cross-linked polymers of styrene.

8. The continuous method of making caustic soda from lime and sodium chloride by exchange of ions which comprises, passing an aqueous lime suspension in contact with a first basic anion exchange resin at least partially in the salt form which is in intimate mixture with solid lime, passing the effluent therefrom in contact with a second appreciably more weakly basic anion exchange resin which is at least partially in the salt form and which is in intimate mixture with solid lime, thereafter passing an aqueous solution of sodium chloride through said second more weakly basic anion exchange resin, passing the effluent from the latter in series through said first basic anion exchange resin, and withdrawing the effluent from the latter as a caustic soda solution, the flow of sodium chloride solutions being in countercurrent direction to the flow of lime suspension through said ion exchange resins.

9. The method of claim 8 wherein the sodium chloride solution is sea water which has been previously treated with a basic compound of the group consisting of calcium and ammonium hydroxides to precipitate and remove the magnesium content thereof.

References Cited in the file of this patent

UNITED STATES PATENTS

| | | |
|---|---|---|
| 1,978,447 | Austerweil et al. | Oct. 30, 1934 |
| 2,606,098 | Bauman | Aug. 5, 1952 |
| 2,793,099 | Clarke | May 21, 1957 |

OTHER REFERENCES

"Properties of Strongly Basic Anion Exchange Resins," R. M. Wheaton and W. C. Bauman, Industrial and Engineering Chemistry, vol. 43, No. 5, May 1951, pp 1088–1093.